United States Patent
Zhao et al.

(10) Patent No.: US 12,280,508 B2
(45) Date of Patent: Apr. 22, 2025

(54) REPRODUCING FAST EYE MOVEMENT USING IMAGING OF ROBOT WITH LIMITED ACTUATOR SPEED

(71) Applicant: Sony Interactive Entertainment Inc., Tokyo (JP)

(72) Inventors: Frank Zhao, San Mateo, CA (US); Koichi Obana, San Mateo, CA (US); Yuichiro Nakamura, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 133 days.

(21) Appl. No.: 18/296,273

(22) Filed: Apr. 5, 2023

(65) Prior Publication Data
US 2024/0335942 A1   Oct. 10, 2024

(51) Int. Cl.
  *B25J 9/16*     (2006.01)
  *G06F 3/01*     (2006.01)
  *G06V 40/18*    (2022.01)
  *H04N 21/472*   (2011.01)

(52) U.S. Cl.
  CPC ........... *B25J 9/1664* (2013.01); *B25J 9/1697* (2013.01); *G06F 3/013* (2013.01); *G06V 40/193* (2022.01); *H04N 21/47217* (2013.01)

(58) Field of Classification Search
  CPC ....... B25J 9/1664; B25J 9/1697; G06F 3/013; G06V 40/193; H04N 21/47217
  See application file for complete search history.

(56) References Cited

U.S. PATENT DOCUMENTS

| | | |
|---|---|---|
| 2003/0019671 A1 | 1/2003 | Inoue et al. |
| 2017/0015003 A1 | 1/2017 | Sutherland et al. |
| 2018/0154514 A1 | 6/2018 | Angle et al. |
| 2019/0138019 A1 | 5/2019 | Hayashi |
| 2020/0298412 A1* | 9/2020 | Funazukuri ............ H04N 23/57 |
| 2023/0062175 A1 | 3/2023 | Yahata |

FOREIGN PATENT DOCUMENTS

WO   2022259595 A1   12/2022

OTHER PUBLICATIONS

Lee et al., "Design of the companion robot interaction for supporting major tasks of the elderly"; Published in: 2017 14th International Conference on Ubiquitous Robots and Ambient Intelligence (URAi); Date of Conference: Jun. 28, 2017-Jul. 1, 2017; retrieved from the internet entire document.

"International Search Report and Written Opinion", dated Jul. 12, 2024, from the counterpart PCT application PCT/US2024/023132.

* cited by examiner

*Primary Examiner* — Sihar A Karwan
(74) *Attorney, Agent, or Firm* — Kilpatrick Townsend & Stockton LLP

(57) ABSTRACT

Techniques for simulating fast eye movement of a robot to mimic human eye saccade are divulged in cases of the robot eyes being moved by actuators that cannot move the eyes fast enough in real time to mimic saccade. Image capture timing is adjusted (i.e., slowed down) to track the speed of the actuators. Then, the resulting sequence of images is time-compressed back to video playback speed so that the video appears to show the robot eye undergoing saccade at human eye speeds.

19 Claims, 4 Drawing Sheets

REPRODUCING FAST EYE MOVEMENT USING IMAGING OF ROBOT WITH LIMITED ACTUATOR SPEED

FIELD

The present application relates generally to techniques for reproducing fast eye movement using imaging of a robot with limited actuator speed.

BACKGROUND

Images from the eyes of a person such as a person wearing a head-mounted device or display (HMD) for purposes of, e.g., playing a computer simulation are used for one or more computer-centric purposes, including personal authentication and eye tracking used in rendering the computer simulation on a display such as a HMD.

SUMMARY

As understood herein, for eye tracking a robot eye may be used for initial calibration and/or algorithm verification because the position of the actuators that move the eyes are known essentially as ground truth eye pose by the same processor that is receiving camera images of the eyes. This is but one example use of robot eye motion. As also understood herein, the actuators of a robot may not be able to move the eyeball fast enough to mimic saccade, which is rapid eye motion that a human eye can make.

Accordingly, a method includes generating a first video segment of an eye of a robot being moved by an actuator at a first, relatively low speed. The method also includes generating a second video segment of the eye being moved by the actuator at a second, relatively high speed. The method then includes playing back the first video segment at a playback rate that is the same as a rate at which frames were acquired to generate the first video segment, and emulating saccade at least in part by playing back the second video segment at a playback rate that is faster than a rate at which frames were acquired to generate the second video segment.

In some examples the second speed is the fastest speed at which the actuator can move the eye. In some implementations the method can include verifying operation of at least one gaze tracking component based at least in part on playing back the first and second video segments. The gaze tracking component can include at least one processor-executed algorithm and/or at least one hardware component.

In another aspect, an apparatus includes at least one processor configured for causing generation of a first video segment of an eye of a robot as the eye moves at a first speed. The first video segment is generated with a first period between successive frames. The processor is configured for causing generation of a second video segment of the eye as the eye moves at a second speed faster than the first speed. The second video segment is generated with a second period between successive frames, and the second period is longer than the first period. The processor is configured for playing back the first and second video segments with the first period being between successive frames in both the first and second video segments.

In another aspect, a system includes at least one computer medium that is not a transitory signal and that in turn includes instructions executable by at least one processor to identify a speed at which a robotic eye can be moved by at least one actuator. The instructions are executable to control at least one camera to capture images of the robotic eye as it moves at time intervals that depend on the speed at which the robotic eye can be moved. The instructions are further executable to play back the images as a video with a time interval between successive images in the video being less than the time intervals used to capture the images of the robotic eye to mimic saccade of a human eye.

The system in example embodiments can include the processor, the actuator, the robot eye, at least one sensor coupled to the actuator and configured for outputting a signal to the processor representing ground truth pose of the eye, and the camera. The instructions may be executable for implementing at least one eye tracking module on the images of the eye to output indications of eye pose, comparing the indications of eye pose to the ground truth pose of the eye, and outputting on at least one display device an indication of eye tracking accuracy based at least in part on the comparing step.

The details of the present application, both as to its structure and operation, can be best understood in reference to the accompanying drawings, in which like reference numerals refer to like parts, and in which:

DETAILED DESCRIPTION

Figure 1:
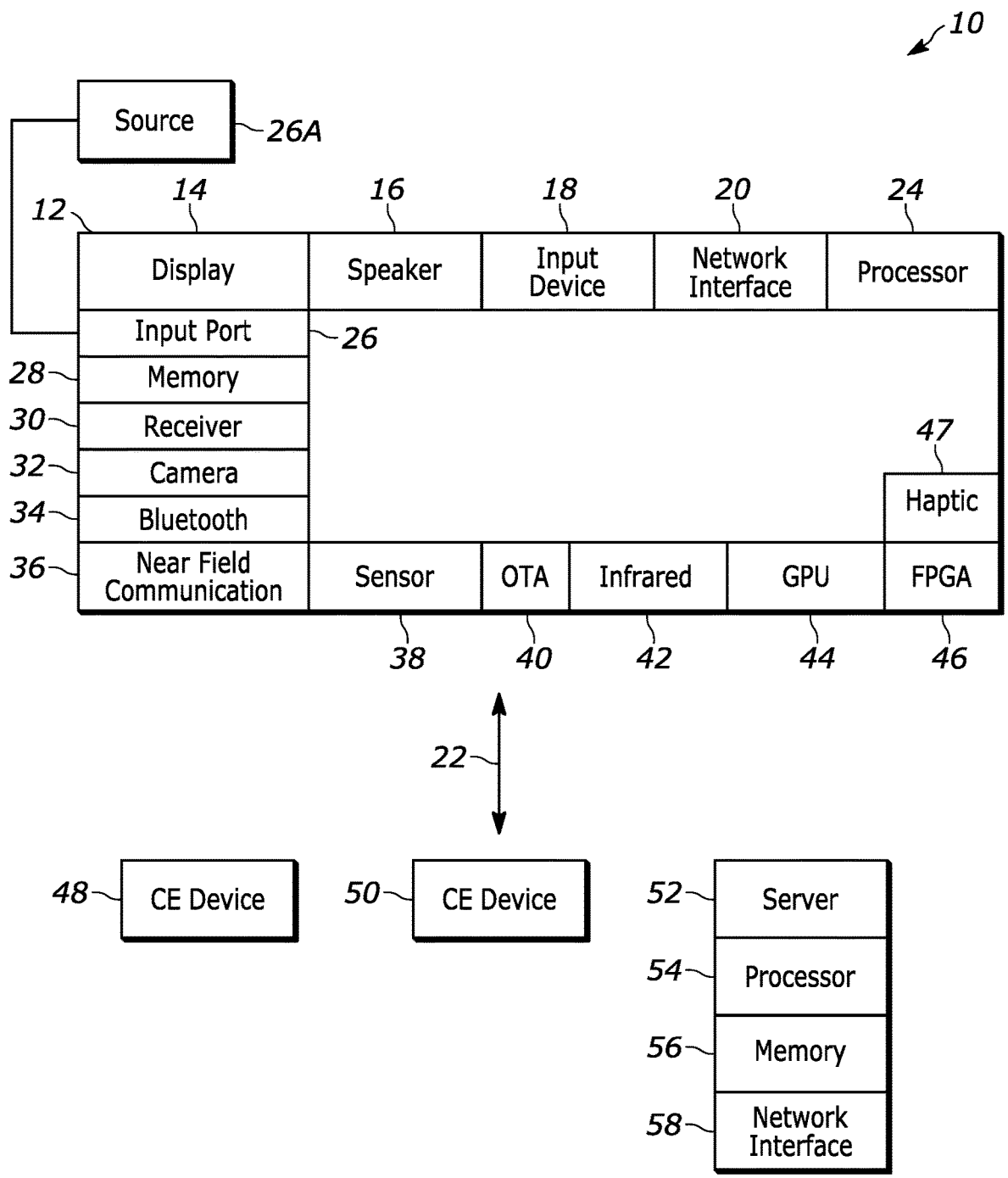
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
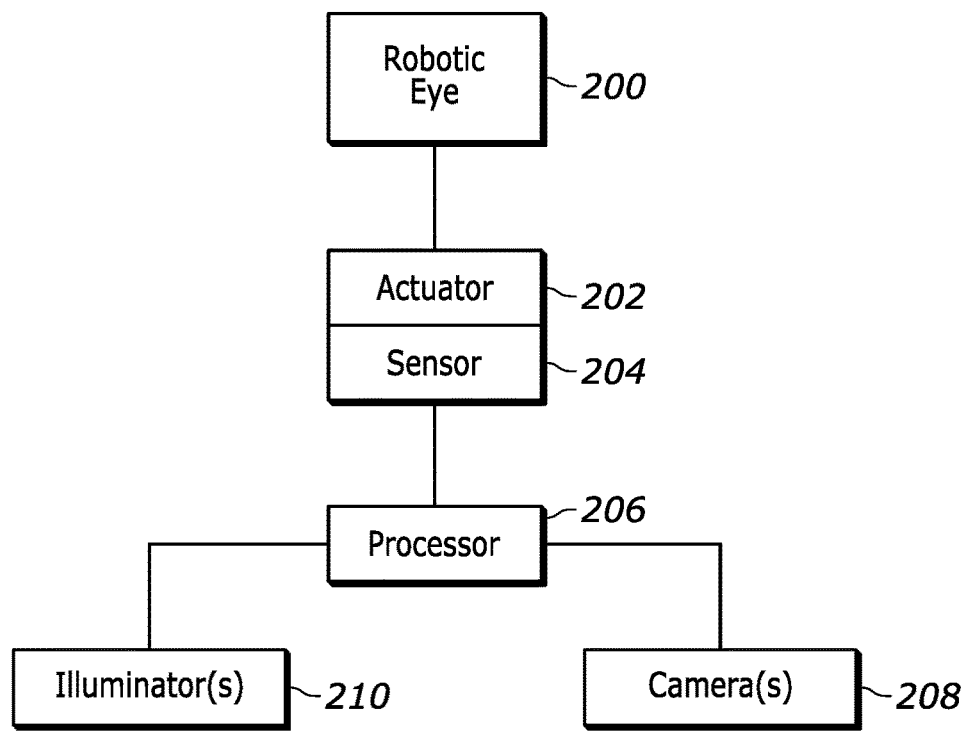
FIG. 2 illustrates an example robot eye motion system.

Turning to FIG. 2, a robotic eye 200 is controlled to move in its socket by an actuator 202 associated with a sensor 204 that senses the position of the actuator 202 and, hence, the pose of the robotic eye 200. The actuator 202 and sensor 204 may be communicatively coupled to one or more processors 206 which is also communicatively coupled to one or more cameras 208 and one or more illuminators 210 such as eye tracking light sources such as light emitting diodes (LED).

Figure 3:
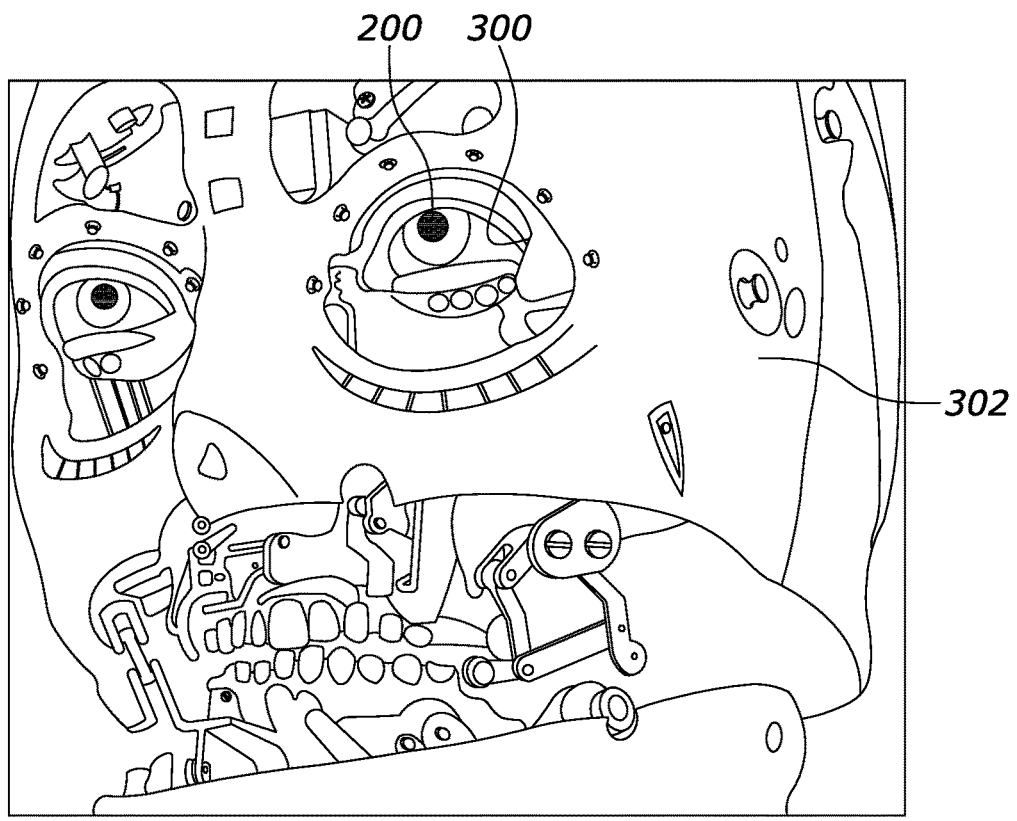
FIG. 3 illustrates a robot with eyes.

FIG. 3 illustrates the robotic eye 200 within a socket 300 of a robotic head 302.

Figure 4:
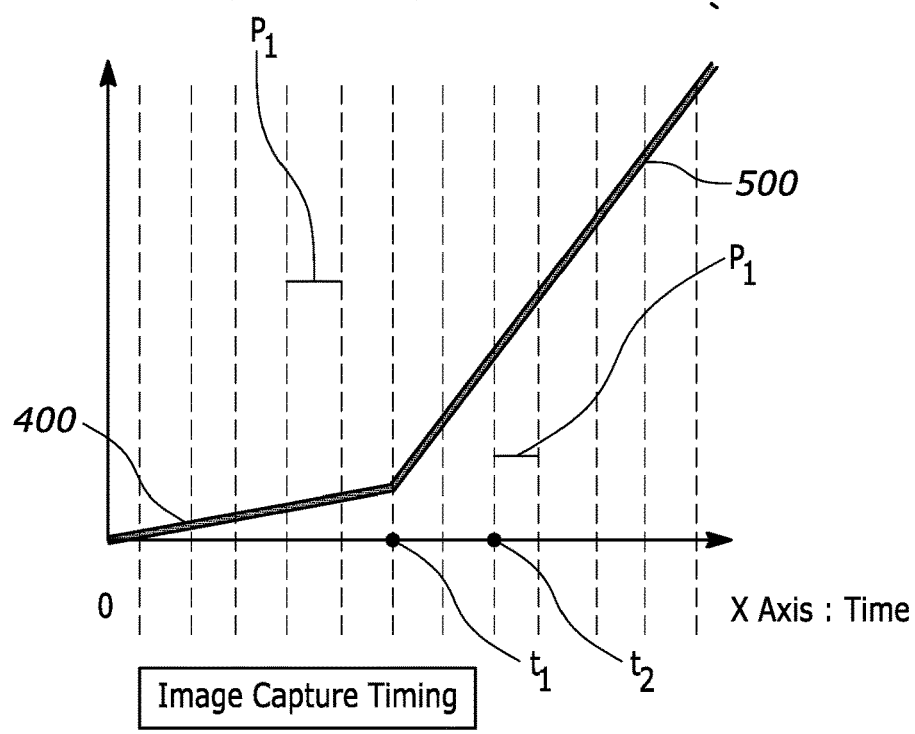
FIGS. 4 and 5 illustrate graphs demonstrating present principles.
Figure 5:
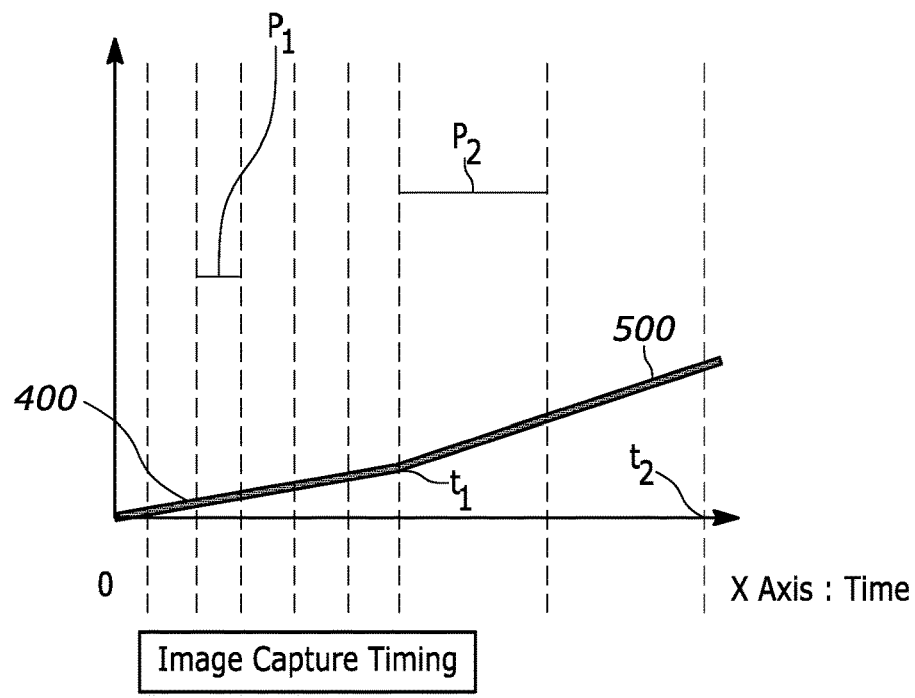
Figure 6:
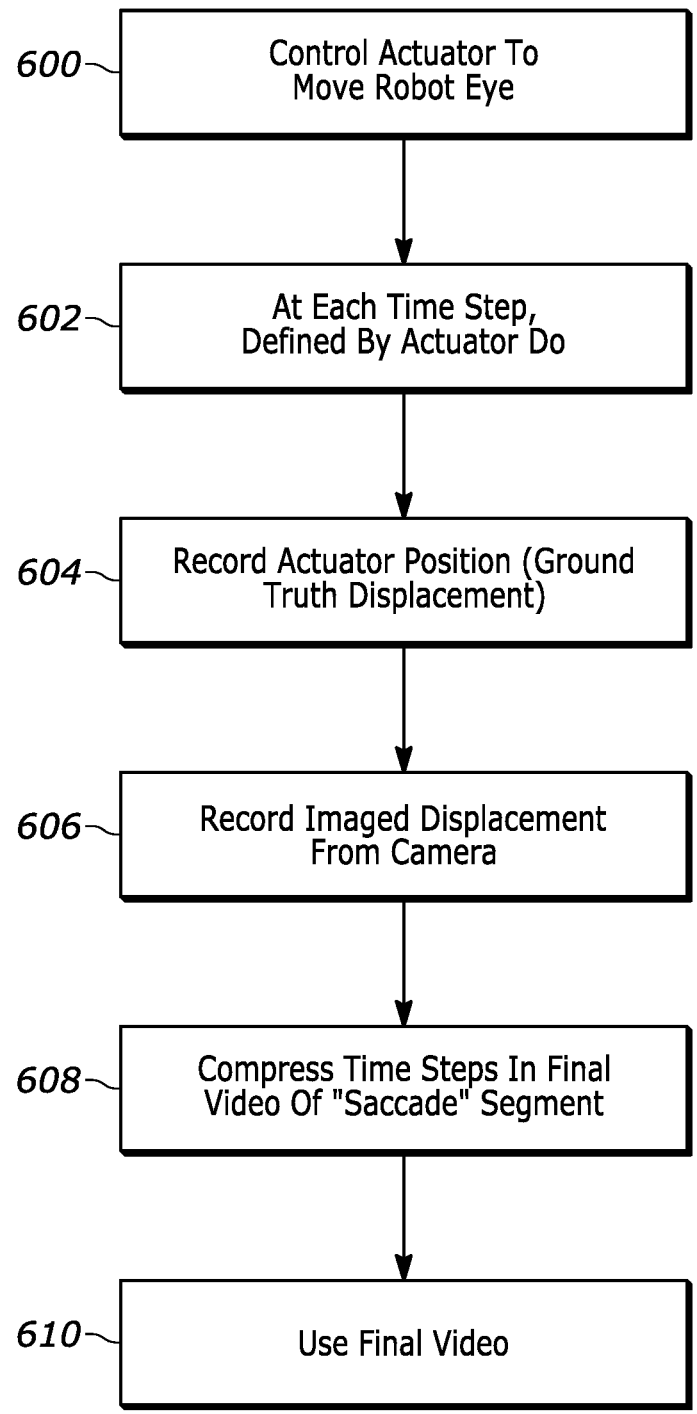
FIG. 6 illustrates example logic in example flow chart format.

FIGS. 4-6 further illuminate present principles. As understood herein, when using the robot to test or calibrate eye tracking systems, it can be difficult to reproduce eye movement that includes quick motion like saccade, owing to limitations of the actuator 202. To address this, quick eye motion such as saccade is simulated by filming robot eye 200 movement as a slow motion phenomenon and playing back the resulting video in faster motion. In this way, saccade can be virtually reproduced even with the actuators that otherwise are not quick enough to move the robot eye 200 at saccade speeds. As further understood herein, eye movement can be effectively reproduced on the robotic eye 200 by combining slow video and normal video motion, since adopting slow motion for all eye movement can consume too much time.

Accordingly, as shown in FIGS. 4 and 5, during a period 400 from time 0 to $t_1$, demanded speed of movement of the robotic eye 200 to achieve a demanded pose displacement (shown on the y-axis) of the eye from an original pose at time=0 to a demanded pose at time=$t_1$ is slow enough that the actuator 202 can achieve moving the eye at the demanded speed. Accordingly, the time period $P_1$ between acquisition of successive frames is at a relatively short or normal filming period.

In contrast, assume that for the period 500 from $t_1$ to $t_2$ (and beyond) a demanded speed of movement of the robotic eye 200 to achieve a demanded pose displacement of the eye from the pose at $t_1$ to a demanded pose at $t_2$ is too fast for the actuator 202 to achieve. In this case, the speed of motion of the robotic eye 200 is established to be, for instance and as example only, as fast as the actuator 202 can achieve (albeit slower than demanded speed), and the image capture timing is adjusted to be slower than the timing from t=0 to $t_1$. This means that the time period $P_2$ (FIG. 5) between acquisition of successive frames after time $t_1$ (when saccade is being emulated) is at a relatively long period, i.e., $P_2 > P_1$.

However, as illustrated in FIG. 4, when the complete video of robotic eye motion is played back, the segment of video up to time=$t_1$ is played back at the speed at which images were acquired (in this case, normal speed) whereas the successive frames of video after time $t_1$ are played back at a speed (in this case, normal speed also) that is faster than the speed at which the images were required. In the example shown, all video, both before and after time=$t_1$, is played back with a period between frames of $P_1$, as shown in FIG. 4.

FIG. 6 provides further explication in example flow chart format. Commencing at block 600, for robotic eye motion that is fast enough to emulate saccade, the actuator 202 is controlled to move the eye, e.g., as fast as the actuator can move the eye. The speed of the actuator is known as is the demanded speed for saccade, and hence the time period $P_2$ can be established based on the difference between demanded saccade speed and maximum actuator speed. At block 602, for each image capture time step as established by the period $P_2$, the actuator position as sensed by the sensor 204 is recorded at block 604 as an indication of ground truth robotic eye pose, and the image of the robotic eye at this ground truth displacement is recorded at block 606. Moving to block 608 the time steps are compressed between the images during the demanded saccade (i.e., the images are played back at the normal period $P_1$ as shown in FIG. 4). The final video as indicated in the time steps of FIG. 4 is used at block 610 to compare ground truth eye pose to imaged eye pose from the camera 208 to ascertain the accuracy of the eye tracking algorithm processing the images to indicate eye pose and/or to calibrate eye tracking hardware processing the images to indicate eye pose. An indication can be output on any audio and/or video display device disclosed herein indicating eye tracking accuracy based at least in part on the comparison of ground truth pose from the actuator to the pose output by the eye tracking algorithm based on the video images of the eye.

While the particular embodiments are herein shown and described in detail, it is to be understood that the subject matter which is encompassed by the present invention is limited only by the claims.

What is claimed is:

1. A method comprising:
    generating a first video segment of an eye of a robot being moved by an actuator at a first, relatively low speed;
    generating a second video segment of the eye being moved by the actuator at a second, relatively high speed;
    playing back the first video segment at a playback rate that is the same as a rate at which frames were acquired to generate the first video segment; and
    emulating saccade at least in part by playing back the second video segment at a playback rate that is faster than a rate at which frames were acquired to generate the second video segment.

2. The method of claim 1, wherein the second speed is a fastest speed at which the actuator can move the eye.

3. The method of claim 1, comprising verifying operation of at least one gaze tracking component based at least in part on playing back the first and second video segments.

4. The method of claim 3, wherein the gaze tracking component comprises at least one processor-executed algorithm.

5. The method of claim 3, wherein the gaze tracking component comprises at least one hardware component.

6. An apparatus:
    at least one processor configured for:
    causing generation of a first video segment of an eye of a robot as the eye moves at a first speed, the first video segment being generated with a first period between successive frames;
    causing generation of a second video segment of the eye as the eye moves at a second speed faster than the first speed, the second video segment being generated with a second period between successive frames, the second period being longer than the first period; and
    playing back the first and second video segments with the first period being between successive frames in both the first and second video segments.

7. The apparatus of claim 6, wherein the eye of the robot is moved by at least one actuator, and the second speed is a fastest speed at which the actuator can move the eye.

8. The apparatus of claim 6, wherein the processor is configured for verifying operation of at least one gaze tracking component based at least in part on playing back the first and second video segments.

9. The apparatus of claim 8, wherein the gaze tracking component comprises at least one processor-executed algorithm.

10. The apparatus of claim 8, wherein the gaze tracking component comprises at least one hardware component.

11. A system comprising:
    at least one computer medium that is not a transitory signal and that comprises instructions executable by at least one processor to:
    identify a speed at which a robotic eye can be moved by at least one actuator;
    control at least one camera to capture images of the robotic eye as it moves at time intervals that depend on the speed at which the robotic eye can be moved; and
    play back the images as a video with a time interval between successive images in the video being less than the time intervals used to capture the images of the robotic eye to mimic saccade of a human eye.

12. The system of claim 11, comprising the at least one processor.

13. The system of claim 12, comprising the actuator.

14. The system of claim 13, comprising the robot eye.

15. The system of claim 14, comprising at least one sensor coupled to the actuator and configured for outputting a signal to the processor representing ground truth pose of the eye.

16. The system of claim 15, comprising the at least one camera configured for capturing the images of the eye.

17. The system of claim 16, wherein the instructions are executable for:
    implementing at least one eye tracking module on the images of the eye to output indications of eye pose.

18. The system of claim 17, wherein the instructions are executable for comparing the indications of eye pose to the ground truth pose of the eye.

19. The system of claim 18, wherein the instructions are executable outputting on at least one display device an indication of eye tracking accuracy based at least in part on the comparing.

* * * * *